(12) United States Patent
Da Silva et al.

(10) Patent No.: US 7,965,389 B2
(45) Date of Patent: Jun. 21, 2011

(54) METHOD FOR RECONSTRUCTING THE DISTRIBUTION OF FLUOROPHORES IN A NON-HOMOGENEOUS MEDIUM BY OPTICAL TOMOGRAPHY IN CONTINUOUS MODE

(75) Inventors: Anabela Da Silva, Grenoble (FR); Anne Koenig, Saint Martin d'Uriage (FR); Lionel Herve, Villeurbanne (FR)

(73) Assignee: Commissariat a l'Energie Atomique, Paris (FR)

(*) Notice: Subject to any disclaimer, the term of this patent is extended or adjusted under 35 U.S.C. 154(b) by 303 days.

(21) Appl. No.: 12/225,865

(22) PCT Filed: Apr. 24, 2007

(86) PCT No.: PCT/FR2007/000693
§ 371 (c)(1),
(2), (4) Date: Oct. 1, 2008

(87) PCT Pub. No.: WO2007/125193
PCT Pub. Date: Nov. 8, 2007

(65) Prior Publication Data
US 2009/0177430 A1    Jul. 9, 2009

(30) Foreign Application Priority Data

Apr. 25, 2006  (FR) .................... 06 03677

(51) Int. Cl.
G01J 3/30  (2006.01)
(52) U.S. Cl. ...................................... 356/317
(58) Field of Classification Search ............... 356/317, 356/318, 417; 250/458.1, 459.1; 600/425
See application file for complete search history.

(56) References Cited

U.S. PATENT DOCUMENTS

| | | | |
|---|---|---|---|
| 5,762,607 A * | 6/1998 | Schotland et al. | 600/407 |
| 6,108,576 A * | 8/2000 | Alfano et al. | 600/476 |
| 7,652,764 B2 * | 1/2010 | Herve et al. | 356/317 |
| 2004/0262520 A1 | 12/2004 | Schotland et al. | |
| 2008/0146897 A1* | 6/2008 | Alfano et al. | 600/310 |
| 2008/0260647 A1* | 10/2008 | Intes et al. | 424/9.6 |

OTHER PUBLICATIONS

Ntziachristos et al. "Experimental Three-Dimensional Fluorescence Reconstruction of Diffuse Media by Use of a Normalized Born Approximation". Jun. 15, 2001; vol. 26, No. 12; Optics Letters; Optical Society of America.
Roy et al. "Fluorescence-Enhanced Optical Tomography Using Referenced Measurements of Heterogeneous Media" IEEE Transactions on Medical Imaging, vol. 22 No. 7, Jul. 2003.
Ye et al. "Modified Distorted Born Iterative Method With an Approximate Frechet Derivative for Optical Diffusion Tomography" vol. 16, No. 7; Jul. 1999; Optical Society of America.

(Continued)

*Primary Examiner* — Michael A Lyons
(74) *Attorney, Agent, or Firm* — Oliff & Berridge, PLC

(57) ABSTRACT

The method enables a non-homogeneous diffusing object to be examined by illuminating the object with a continuous light by means of a light source. It previously comprises reconstruction of the three-dimensional spatial mapping of an attenuation variable representative of the diffusion and absorption non-homogeneities of the object, by resolving a diffusion equation $$\nabla^2 F(\vec{r}_S, \vec{r}) - k'^2(\vec{r}) F(\vec{r}_S, \vec{r}) = A_S \delta(\vec{r} - \vec{r}_S).$$

In the diffusion equation, $A_S$ is a constant, $\vec{r}$ the spatial coordinate of any point of the mesh of a volume at least partially containing the object, and $\vec{r}_S$ the spatial coordinate of the light source. The transfer functions of an equation used for reconstructing the distribution of fluorophores integrate the attenuation variable reconstituted in this way.

5 Claims, 3 Drawing Sheets

OTHER PUBLICATIONS

Arridge et al. "Nonuniqueness in Diffusion-Based Optical Tomography" vol. 23, No. 11; Jun. 1, 1998; Optical Society of America.

Arridge. "Optical Tomography in Medical Imaging" Inverse Problems 15 (1999) R41-R93.

Cong et al. "A Born-Type Approximation Method for Bioluminescence Tomography" Medical Physics, Vo. 33, No. 3, Mar. 2006.

Wang et al. "Imaging of Scattering Media by Diffusion Tomography: An Iterative Perturbation Approach" SPIE, vol. 1641 (1992).

* cited by examiner

METHOD FOR RECONSTRUCTING THE DISTRIBUTION OF FLUOROPHORES IN A NON-HOMOGENEOUS MEDIUM BY OPTICAL TOMOGRAPHY IN CONTINUOUS MODE

BACKGROUND OF THE INVENTION

The invention relates to a method for reconstructing the distribution of fluorophores in a non-homogeneous diffusing object by optical tomography, comprising
  illumination of the object with continuous light by a light source,
  measurement of the light intensity received by detectors at a fluorescence wavelength and
  resolution, at each point of a mesh of a volume at least partially containing the object to be observed, of an equation expressing the relation between the measured light intensity, a parameter representative of the properties of the fluorophores, and transfer functions representative of the energy transfer between each of the sources and the fluorophores and between the fluorophores and detectors.

STATE OF THE ART

Fluorescence tomography consists in determining the three-dimensional distribution of fluorophores in an object comprising a diffusive medium. The object is illuminated by a light having a wavelength λex corresponding to excitation of the fluorophores. Then the fluorescence light is measured, the wavelength λfl of this light being offset with respect to the excitation wavelength.

As illustrated schematically in FIG. 1, a single-point excitation light source S placed at a point $r_S$ emits a light of amplitude Q at the excitation wavelength λex. The emitted light propagates in a volume V, schematically represented by a cylinder but able to be of any shape, of a diffusive medium in which fluorescent elements or fluorophores f ($f_1$, $f_2$ and $f_3$ in FIG. 1) are located with a distribution to be determined. In FIG. 1, a first diffusive wave $L_{sf}$ emitted by source S excites a fluorescent element $f_1$ which then emits a radiation at the fluorescence wavelength λfl, generally higher than λex. The intensity of this radiation, represented in FIG. 1 by a second diffusive wave $L_{fd}$, is measured at a point $r_d$ by a detector d. The distribution of the fluorescent elements f then has to be determined from the measurements made by detector d. An optical filter (not shown) enables only the signals received by the detector at the fluorescence wavelength λfl to be measured. These measurements are made from a set of positions of the source so as to scan the whole volume V. Conventionally several detectors are arranged such as to form an array or matrix and the measurements made by each of the detectors are taken into account.

Fluorescent elements f are arranged in volume V, and each detector d receives a measured photon density $\phi^m$ composed by all the second waves $L_{fd}$ emitted, at fluorescence wavelength λfl, by the set of fluorescent elements f arranged at points $r_f$ of volume V. For the sake of clarity, the waves corresponding to fluorescent elements $f_2$ and $f_3$ are not represented in FIG. 1.

Conventionally, light intensity or photon density $\phi^m$ expressed in W/m² and measured by detector d placed at point $r_D$, is expressed by the following equation:

$$\phi^m(\vec{r}_s, \vec{r}_d) \propto Q(\vec{r}_s) \cdot \int_V F(k_{ex}, \vec{r}_s, \vec{r}_f) \beta(\vec{r}_f) F(k_{fl}, \vec{r}_f, \vec{r}_d) d\vec{r}_f \quad (1)$$

in which
  the parameter
  $$\beta(\vec{r}_f) = \eta \cdot \delta\mu(\vec{r}_f)$$
  depends on the quantum efficiency η of the fluorescent element and on the local absorption $\delta\mu(\vec{r}_f)$ due to the fluorescent elements;
  a first transfer function $F(k_{ex}, \vec{r}_S, \vec{r}_f)$ is representative of the energy transfer between single-point excitation light source S and fluorescent element f situated at point $r_f$;
  a second transfer function $F(k_{fl}, \vec{r}_f, \vec{r}_d)$ is representative of the energy transfer between fluorescent element f located at point $r_f$ and detector d.

The measured intensity $\phi^m$ is thus proportional to the amplitude $Q(r_S)$ of the light emitted by source S and to the integral, over the whole volume V, of the product of the first and second transfer functions F and of the parameter β.

The first and second transfer functions F are conventionally proportional to Green's functions G determined by resolving the following diffusion equation for a finite volume V and for a given wavelength λ:

$$\nabla^2 G(k_\lambda, \vec{r}, \vec{r}_O) - k_\lambda^2 G(k_\lambda, \vec{r}, \vec{r}_O) = -4\pi\delta(\vec{r} - \vec{r}_O) \quad (3)$$

in which δ is the Dirac function and $$k_\lambda = \sqrt{\frac{\mu_\lambda}{D_\lambda}}$$

the wave number. In these expressions, $\mu_\lambda$ is the absorption coefficient of the medium at the wavelength λ, $D_\lambda$ is the diffusion coefficient at the wavelength λ, $\vec{r}$ and $\vec{r}_O$ are spatial variables of the Green's function and ∇ is the gradient spatial derivative operator.

In known methods, the medium is generally assumed to be homogeneous, i.e. the absorption coefficient $\mu_\lambda$, the diffusion coefficient $D_\lambda$, and consequently the wave number $k_\lambda$, are constant for a given wavelength. The parameters $\mu_\lambda$ and $D_\lambda$ are evaluated at wavelengths $\lambda_{ex}$ and $\lambda_{fl}$. Furthermore, the diffusion equation solutions have to comply with conditions at the limit of the surface delimiting the volume, for example Dirichlet's conditions or Neumann's conditions.

The expressions thus found for the Green's functions are then introduced into equation (1). For a discrete calculation, the space of volume V is divided into N elementary volumes with an appropriate mesh. The integral of equation (1) is then replaced by a sum on the N elementary volumes $dv_j$ making up volume V:

$$\phi(\vec{r}_s, \vec{r}_d) \propto \sum_{j=1}^{N} G(k_{ex}, \vec{r}_s, \vec{r}_j) \beta(\vec{r}_j) G(k_{fl}, \vec{r}_j, \vec{r}_d) dv_j \quad (4)$$

A first energy transfer function $G(k_{ex}, \vec{r}_S, \vec{r}_j)$ and a second energy transfer function $G(k_{fl}, \vec{r}_j, \vec{r}_d)$ are thus associated with each elementary volume $dv_j$.

When a plurality $N_S$ of single-point excitation light sources S and a plurality $N_D$ of detectors d are considered, a matrix representation can be chosen:

$$[\phi]_N^{D \times N_S} = [G_{fd}]_N^{D \times N} [\beta dv]_{N \times N} [G_{sf}]_{N \times N}^S [Q]_N^S \quad (5)$$

In this equation, each column of $[\phi]_N^{D \times N_S}$ represents measurement on $N_D$ detectors for a given source S.

For each source S and for each detector d, a conversion matrix J can be 15 calculated, which enables the measured photon density $\phi^m$ to be connected in linear manner to the parameter $\beta$:

$$\phi_{sd}^m = \sum_{j=1}^{N} J_{sdj} \beta_j \quad (6)$$

The matrix equation can then be constructed from the set of source-detector combinations, which equation is then resolved in a reconstruction algorithm. This resolution can be performed either by calculating the error between the experimental measurements and this theoretical matrix equation, for example by means of the error retroprojection method or algorithms of ART (Algebraic Reconstruction Technique) type, or by directly inversing the matrix J, for example by means of SVD (Singular Value Decomposition) type algorithms.

In the case of error calculation between the experimental measurement and theory, a theoretical distribution of the fluorescent elements is used, which is adjusted throughout the calculation so as to reduce this error.

In the case of matrix inversion, the parameter $\beta$ is obtained in a first step, which parameter depends on the distribution of the fluorescent elements by means of local absorption $\delta\mu(\vec{r}_f)$ due to the fluorescent elements. Knowing the parameter $\beta$ thus enables the distribution and local concentration of the fluorescent elements to be determined.

The diffusive medium does however generally present non-homogeneities. To take account of the non-homogeneities of the object, it would theoretically be possible to reconstruct both the volume distribution of the diffusion coefficient $D_\lambda$ and the volume distribution of the absorption coefficient of the medium $\mu_\lambda$ or of the wave number $k_\lambda$, and then work back to the fluorescence distribution. In practice, two approaches have been used to date.

The first approach, described in particular in the article "Experimental three-dimensional fluorescence reconstruction of diffuse media by use of a normalized Born approximation" by V. Ntziachristos et al. (Optics Letters Vol. 26, No. 12, 2001), uses continuous light signals and a flat geometry. The object is considered as being homogeneous from the point of view of the optic absorption and diffusion properties and the fluorescence measurement signals are normalized with respect to the measurement signals at excitation wavelength. However this correction is not sufficient, for the optic properties of the medium at excitation wavelength and at fluorescence wavelength are different and the optic paths followed by the fluorescence and excitation photons are different. This first approach nevertheless enables a reconstruction technique based on an analytical formulation of the problem to be conserved.

The second, more complex, approach described in particular in the article "Fluorescence-Enhanced Optical Tomography Using Referenced Measurements of Heterogeneous Media" by R. Roy et al. (IEEE Transactions on Medical Imaging Vol. 22, No. 7, 2003), uses frequency and/or time signals. The light excitation signals then have to be modulated in intensity at a given frequency or be formed by pulsed signals to reconstitute separately the absorption coefficient mapping and the diffusion coefficient mapping. Reconstruction of the three-dimensional distribution of the fluorophores can then only be performed by numerical methods and no longer by an analytical formulation of the problem.

It is therefore not possible at the present time to discriminate the diffusion coefficient D and the wave number k or absorption coefficient $\mu$ using a light source supplying continuous signals. Reconstruction of a non-homogeneous object by fluorescence optical tomography can consequently not take this non-homogeneity into account without using pulsed or intensity-modulated light signals, which moreover means that numerical resolution has to be used, which is complex and costly.

OBJECT OF THE INVENTION

The object of the invention is to remedy the shortcomings of known methods for reconstructing the distribution of fluorophores in a non-homogeneous medium by optical tomography. In particular, the invention must enable illumination of the object with a continuous light to be used, while correctly taking into account the non-homogeneity of the object as regards both the absorption properties and the diffusion properties.

According to the invention, this object is achieved by a method according to the appended claims

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

Figure 1:
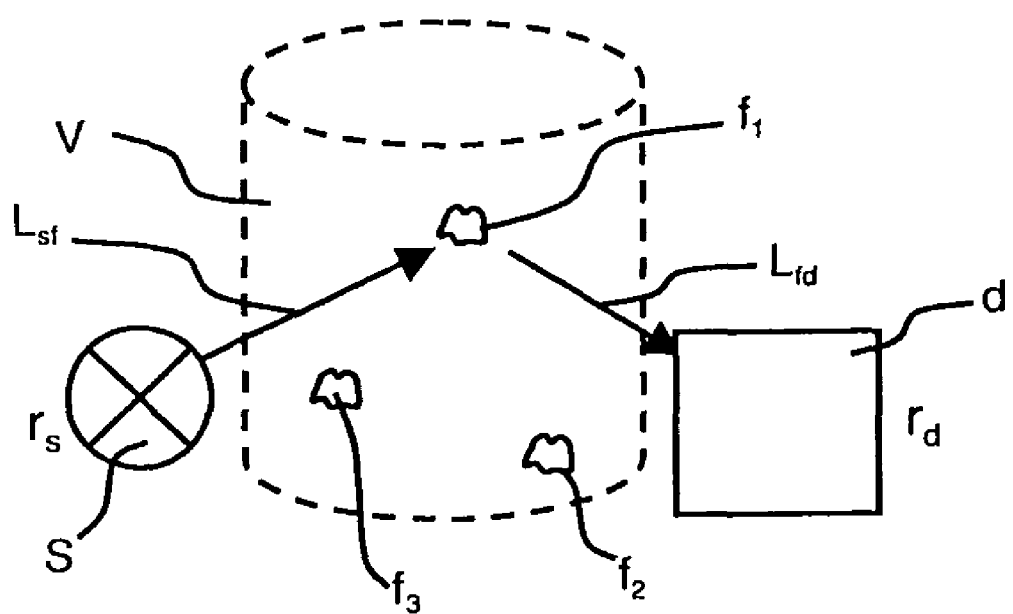
FIG. 1 schematically illustrates known propagation of light in a diffusing medium.

According to the invention, the absorption coefficient and the diffusion coefficient of the medium do not have to be determined separately to work back to the three-dimensional distribution of fluorophores in a diffusive and absorbent non-homogeneous medium.

For a non-homogeneous medium, the diffusion equation to be used to reconstruct the distribution of fluorophores can be written in the following form $$\nabla^2 F(\vec{r}_s, \vec{r}) - \left( k_\lambda^2(\vec{r}) - \frac{\nabla D_\lambda(\vec{r})}{D_\lambda(\vec{r})} \cdot \nabla \right) F(\vec{r}_s, \vec{r}) = -Q(\vec{r}_s) \frac{\delta(\vec{r} - \vec{r}_s)}{D_\lambda(\vec{r})} \quad (7)$$

in which the initial wave number $k_\lambda(\vec{r})$ depends on position r of the considered point of volume V and in which diffusion coefficient $D_\lambda$ is never zero, as the medium involved is a diffusive medium.

As the variables $k_\lambda$ and $D_\lambda$ both depend on the position r, this equation can therefore a priori only be resolved if the three-dimensional spatial distribution of these two variables in volume V is known. As pointed out before, this is currently only possible with pulsed or modulated light signals.

However, in the case of a single-point source, the Dirac function $\delta(\vec{r} - \vec{r}_S)$ is zero except for the source position, i.e. except for $\vec{r} = \vec{r}_S$. The term on the right of equation (7) can then be written $A_S\delta(\vec{r} - \vec{r}_S)$, an expression in which $A_S = -Q(\vec{r}_S)/D_\lambda(\vec{r}_S)$ is a constant.

Furthermore, it can be shown that the photon density $\phi = F$ can be decomposed into spherical waves, in particular if we place ourselves far from the interfaces within a diffusing medium. Under these conditions, it can be shown that the operator $$\frac{\nabla D_\lambda(\vec{r})}{D_\lambda(\vec{r})} \cdot \nabla$$

applied to $F(\vec{r}_S, \vec{r})$ in equation (7) can be written as the product of a function $\alpha(\vec{r})$ depending only on the spatial coordinates and on $F(\vec{r}_S, \vec{r})$. This function $\alpha(\vec{r})$ can be considered as a non-homogeneity term representative of the spatial variation of diffusion coefficient $D_\lambda$.

A change of variable can then be made, in equation (7), introducing a new variable k'(r), such that:

$$k'^2(\vec{r}) = k_\lambda^2(\vec{r}) - \frac{\nabla D_\lambda(\vec{r})}{D_\lambda(\vec{r})} \cdot \nabla = k_\lambda^2(\vec{r}) - \alpha(\vec{r}) \qquad (8)$$

The new variable k' therefore depends on the initial wave number k and on the spatial variation of diffusion coefficient D. As the medium considered is assumed to be non-homogeneous, k' is never constant.

Equation (7) can then be written:

$$\nabla^2 F(\vec{r}_S, \vec{r}) - k'^2(\vec{r})F(\vec{r}_S, \vec{r}) = A_S\delta(\vec{r} - \vec{r}_S) \qquad (9)$$

In all cases, it can be considered that the approximation made when decomposing the signal into spherical waves can be integrated in the values of attenuation variable k', which is, at each point r, globally representative of the attenuation, i.e. of the diffusion and absorption properties of the medium.

Equation (7) having thus been transposed into an equation (9) with a single unknown k', it then becomes possible to resolve this equation and to reconstruct a mapping of the distribution of attenuation variable k' in volume V to be observed using continuous light.

Reconstruction of the three-dimensional spatial mapping, i.e. the volume distribution, of attenuation variable k' can be achieved by any reconstruction method by resolving equation (9) by any suitable means, either by conventional numerical techniques or by analytical techniques. Numerical techniques, for example of finite elements type or finite differences type, in particular enable both large variations and small variations of k' to be processed.

Figure 2:
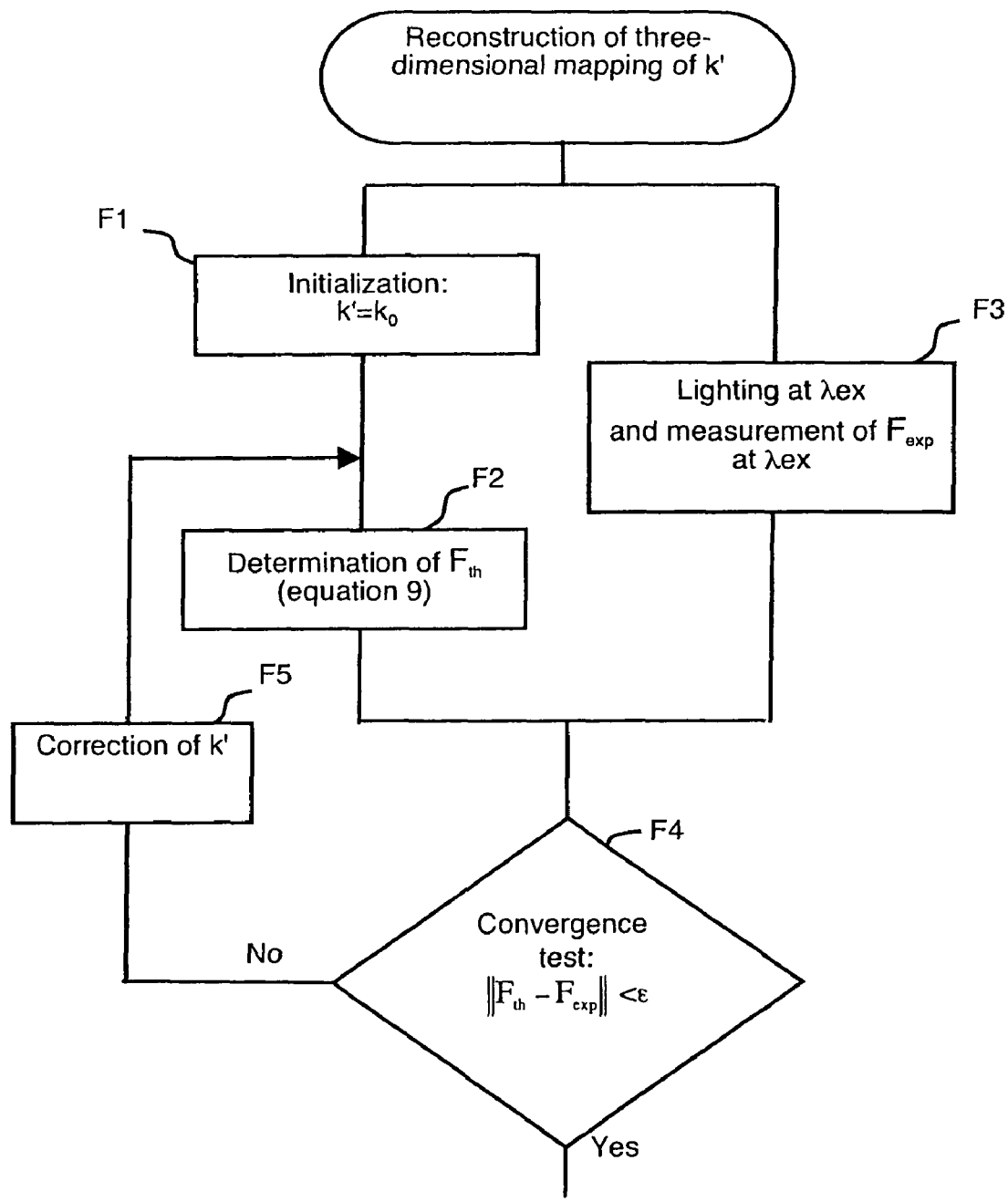
FIGS. 2 and 3 represent a particular embodiment of the method according to the invention in flowchart form.

As represented in FIG. 2, this reconstruction can be obtained by successive iterations using a convergence tending to reduce the difference between a theoretical photon density $F_{th}(\vec{r}_S, \vec{r})$, determined by resolving equation (9), and a measured experimental photon density $F_{exp}(\vec{r}_S, \vec{r})$.

Determining the theoretical photon density $F_{th}$ begins with an initialization step F1 in which an initial value $k_0$, which may be any value, is assigned to attenuation variable k'. Then in a step F2, theoretical photon density $F_{th}$ is determined according to equation 9, either numerically or analytically.

Experimental determination of theoretical photon density $F_{th}$ is further performed, in a step F3, by illuminating the object to be observed with continuous light and measuring the quantity of photons received by the detectors at the same wavelength, λex in FIG. 2. This determination is performed in conventional manner by processing the signals supplied by each of the detector elements for each source-detector couple. Experimental determination is performed, in continuous light, at least at excitation wavelength λex, to perform three-dimensional spatial mapping of attenuation variable $k'_{ex}$.

Then the convergence test is performed in a step F4. Any known convergence test can be used. In the particular embodiment illustrated in FIG. 2, the modulus $\|F_{th} - F_{exp}\|$ of the difference between the theoretical value $F_{th}$ and experimental value $F_{exp}$, previously determined in steps F2 and F3, is compared with a preset value of a difference parameter $\epsilon$. If the modulus of their difference is not lower than difference parameter $\epsilon$ (No output of F4), the variable k' is corrected in a step F5 (by means of the methods conventionally used to make two quantities converge), before determining a new value of the theoretical photon density $F_{th}$ in a new step F2, taking account of the adjustment of variable k'. The new value of $F_{th}$ is then compared with $F_{exp}$ and this process is continued so long as the modulus remains higher than $\epsilon$. When the convergence test is positive (Yes output of F4), i.e. when the modulus of the difference is lower than $\epsilon$, the value of k' stored during step F5 is considered to be correct.

Determination of k' is performed for each point r of a regular or irregular mesh of a volume containing at least the area of interest of the object to be observed. Three-dimensional spatial mapping of variable k' at the excitation wavelength is thereby obtained in this area.

As indicated above, determination of $F_{th}$ in step F2, can be performed numerically or analytically.

In the numerical approach, for example of finite differences or finite elements type, equation (9) is resolved at each iteration, i.e. at each step F2, using the initial value $k_0$ of k' in the 1$^{st}$ calculation of $F_{th}$, and the corrected value of k' in the subsequent calculations of $F_{th}$.

Using a disturbance approach or a weak disturbances method, an analytical formalism can be preserved. The signal F is decomposed into a known reference signal characterizing a homogenous medium, of which the solution $F_0$ and a disturbance residue $\delta\phi$ are known, corresponding to the spatial variation $\delta k$ of the variable k' decomposed according to the expression:

$$k^2(\vec{r}) = k_0^2 + \delta k^2(\vec{r}) \qquad (10)$$

The spatial variations of attenuation variable k' are thereby treated as a disturbance.

The photon density can then be written approximately:

$$F(\vec{r}_S, \vec{r}) = F_0(\vec{r}_S, \vec{r}) + \delta(\vec{r}_S, \vec{r}) \qquad (11)$$

In this disturbance approach, transfer function F is thus determined by Dyson's equation:

$$F(\vec{r}_S, \vec{r}) = F_0(\vec{r}_S, \vec{r}) + \int_{\vec{r}'} F(\vec{r}_S, \vec{r}')\delta k^2(\vec{r}')F_0(\vec{r}', \vec{r})d\vec{r}' \qquad (12)$$

Transfer function F is then expressed directly in linear manner as a function of attenuation variable k', itself decomposed into $k_0$ and $\delta k$, and the value of $F_{th}$ can be obtained directly at each step F2 from the corrected value of k' using functions (10) and (12), without equation (9) having to be resolved again.

In all cases, reconstruction of the mapping of k' is achieved by successive iterations enabling variable k' to be adjusted to make the theoretical value and experimental value of F converge.

The measured fluorescence signal used to then reconstruct the distribution of fluorophores in the object considered by fluorescence tomography does in fact depend on the optical properties of the object at both excitation wavelength and fluorescence wavelength. Theoretically, if the optical diffusion and absorption non-homogeneities of the object are represented by attenuation variable k', according to equation (1) in which k is replaced by k', not only the mapping of variable $k'_{ex}$ at the excitation wavelength but also the mapping of variable $k'_{fl}$ at the fluorescence wavelength have to be known.

Three-dimensional spatial mapping of attenuation variable $k'_{fl}$ can be obtained in a similar manner to three-dimensional spatial mapping of attenuation variable $k'_{ex}$ at the excitation wavelength by replacing illumination of the object with continuous light at the excitation wavelength and measurement of the same wavelength, in step F3 of FIG. 2, by illumination with continuous light at fluorescence wavelength λfl, measurement also being made at the fluorescence wavelength.

However, the excitation and fluorescence wavelengths are generally relatively close, the difference between the two typically being a few tens of nanometers. In practice, the attenuation difference at the two wavelengths can be ignored and it can be considered that $k'_{fl}=k'_{ex}$. In this case, k' simply has to be mapped at the excitation wavelength, as illustrated in FIG. 2.

The variation of the optical properties as a function of the wavelength is sometimes known for the main constituents of the medium. This is in particular the case of water, blood and certain diffusing particles. The value of $k'_{fl}$ can then be extrapolated at each point from the value determined for $k'_{ex}$, for example by linear regression.

The distribution of fluorophores can then be reconstructed from equation (13) below, obtained by modifying equation (1) in which the wave number k is replaced by the attenuation variable k':

$$\phi^m(\vec{r}_S, \vec{r}_d) \propto Q(\vec{r}_S) \cdot \int_V F(k'_{ex}, \vec{r}_S, \vec{r}_f) \beta(\vec{r}_f) F(k'_{fl}, \vec{r}_f, \vec{r}_d) d\vec{r}_f \quad (13)$$

Figure 3:
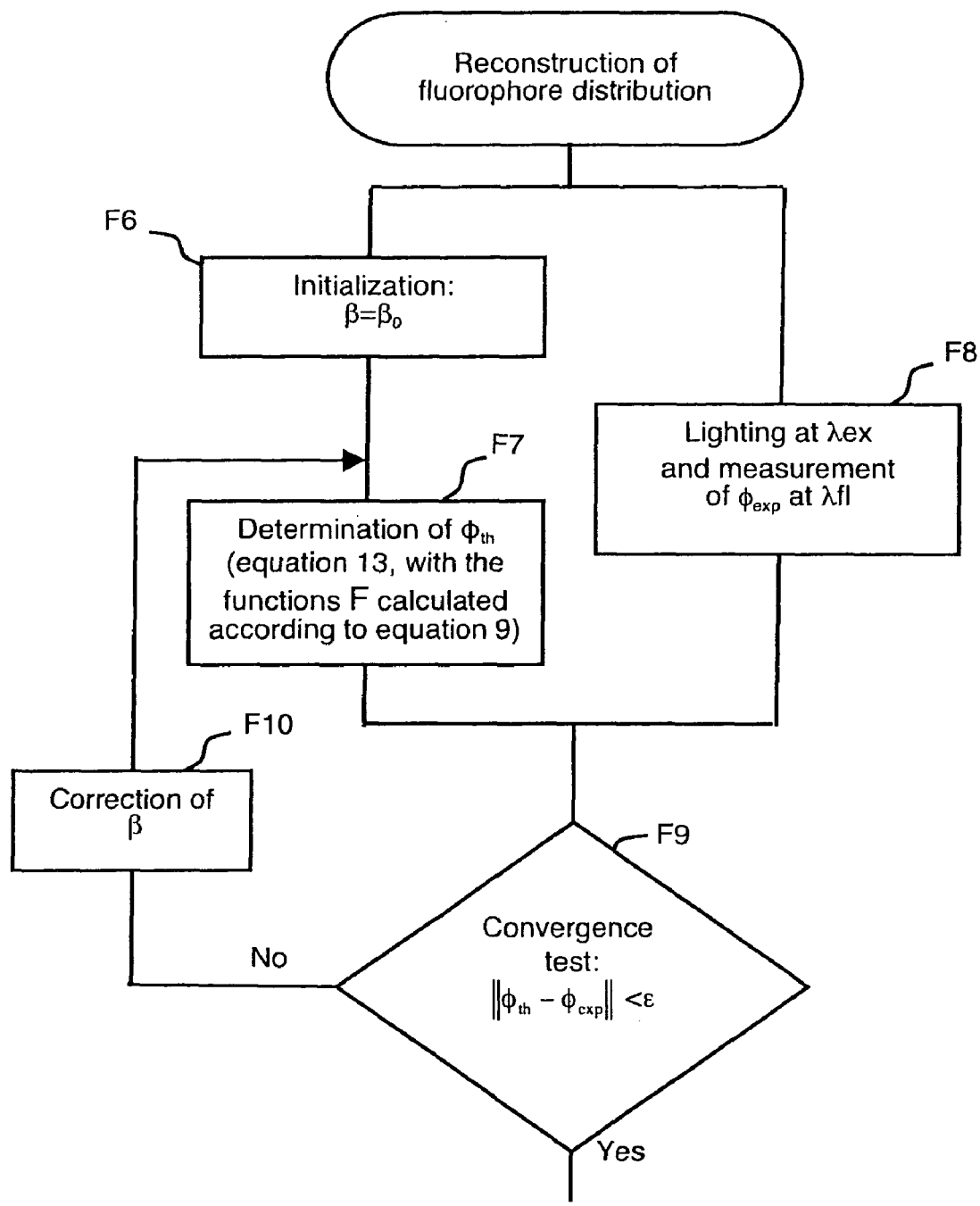

FIG. 3 illustrates a particular embodiment of reconstruction of the distribution of fluorophores. In a similar way to the method for reconstructing attenuation variable k' according to FIG. 2, reconstruction of the distribution of fluorophores consists in resolving linear equation (13) by a linear system resolution method (ART, SVD, conjugate gradients, etc.). This can be achieved, for example in the conjugate gradients method, by using a convergence test tending to reduce the difference between a theoretical photon density $\phi_{th}$, determined by resolving equation (13), and a measured experimental photon density $\phi_{exp}$.

Determining the theoretical photon density $\phi_{th}$ begins with an initialization step F6, in which an initial value $\beta_0$, which may be any value, is assigned to the parameter β. Then the theoretical photon density $\phi_{th}$ is determined either numerically or analytically according to equation (13) in a step F7. In this step, the functions F of equation (13) are determined from equation (9) using the values of k' determined when reconstruction of the mapping of k' is performed (FIG. 2).

Furthermore, experimental determination of the theoretical photon density $\phi_{th}$ is performed, in a step F8, by illuminating the object to be observed with continuous light at excitation wavelength λex and measuring the quantity of photons received, after filtering, by the detectors at fluorescence wavelength λfl. This determination is performed in conventional manner by processing the signals supplied by each of the detector elements for each source-detector couple.

Then the convergence test is performed in a step F9. As before, any known convergence test can be used. In the particular embodiment illustrated in FIG. 3, the modulus $\|\phi_{th}-\phi_{exp}\|$ of the difference between the theoretical value $\phi_{th}$ and experimental value $\|\phi_{exp}\|$, previously determined in steps F7 and F8, is compared with a predetermined value of a difference parameter ε. If the modulus of their difference is not lower than the difference parameter ε (No output of F9), the value of parameter β is corrected (using the methods conventionally used to make two quantities converge) in a step F10, before determining a new value of the theoretical photon density $\phi_{th}$ in a new step F7, taking account of adjustment of the value of parameter β. The new value of $\phi_{th}$ is then compared with $\phi_{exp}$ and this process is continued so long as the modulus of the difference remains higher than ε. When the convergence test is positive (Yes output of F9), i.e. when the modulus of the difference is lower than ε, the value of β stored in step F10 is considered to be correct.

Determination of parameter $\beta(\vec{r}_f)$, performed for each location r of the mesh of the volume at least partially containing the object to be observed, conventionally provides the required information relating to the location and properties of the fluorophores.

Replacing the wave number k in equation (1) by an attenuation variable k' whose three-dimensional spatial mapping is determined beforehand thereby is enables the non-homogeneities of diffusion of the object to be taken into account, while at the same time using a continuous light. A formalism of analytical type can then be used both for reconstructing the three-dimensional spatial mapping of the attenuation variable and for reconstructing the distribution of fluorophores.

The invention claimed is:

1. A method for reconstructing a distribution of fluorophores in a non-homogeneous diffusing object by optical tomography, the method comprising:
   illumination of the object with continuous light by at least a light source at a first light intensity;
   measurement of a second light intensity received by at least one detector at a fluorescence wavelength;
   resolution, at each point of a mesh of a volume at least partially containing the object, of an equation expressing a relation between the measured second light intensity, a parameter representative of the properties of the fluorophores, and a first transfer function and a second transfer function respectively representative of the energy transfer between the light source and a fluorescent element and between the fluorescent element and the at least one detector, the first and second transfer functions being respectively as function of a wave number at an excitation wavelength and of a wave number at a fluorescence wavelength;
   reconstruction of a three-dimensional spatial mapping of a first attenuation variable at the excitation wavelength representative of non-homogeneities of diffusion and absorption of the object;
   reconstruction of a three-dimensional spatial mapping of a second attenuation variable at the fluorescence wavelength; and
   reconstruction of a fluorophores distribution by replacing respectively into the first and second transfer functions the wave number at the excitation wavelength by the first attenuation variable at the excitation wavelength and the wave number at the fluorescence wavelength by the second attenuation variable at the fluorescence wavelength.

2. The method according to claim 1, wherein reconstruction of the three-dimensional spatial mapping of the first attenuation variable at the excitation wavelength is obtained by illuminating the object with continuous light at the excitation wavelength and measurement of an experimental photon density by the at least one detector and by resolving a diffusion equation $$\nabla^2 F(\vec{r}_s, \vec{r}) - k'^2_{ex}(\vec{r}) F(\vec{r}_s, \vec{r}) = A_S \delta(\vec{r} - \vec{r}_s)$$

in which $k'_{ex}(r)$ is the first attenuation variable, $A_s$ is a constant, $\vec{r}$ is a spatial coordinate of any point of the mesh and $\vec{r}_s$ is a spatial coordinate of the light source, the reconstruction being obtained by successive iterations by using a convergence test reducing a difference between a theoretical photon density, determined by resolving the diffusion equation, and the measured experimental photon density.

3. The method according to claim 2, wherein reconstruction of the three-dimensional spatial mapping of the second attenuation variable at the fluorescence wavelength is obtained in a similar way as the reconstruction of the three-dimensional spatial mapping of the first attenuation variable at the excitation wavelength, by replacing illuminating the object with continuous light at the excitation wavelength with illuminating the object with continuous light at the fluorescence wavelength.

4. The method according to claim 1, wherein at each point of the mesh, the second attenuation variable at the fluorescence wavelength is considered as being identical to the first attenuation variable at the excitation wavelength.

5. The method according to claim 1, wherein a variation of optical properties of the object as a function of wavelength being known, the second attenuation variable at the fluorescence wavelength is obtained by extrapolation of the first attenuation variable at the excitation wavelength at each point of the mesh.

\* \* \* \* \*